United States Patent [19]

McKeehan et al.

[11] Patent Number: 6,061,708
[45] Date of Patent: *May 9, 2000

[54] SYSTEM AND METHOD FOR SUPPORTING MIXED-PHASE TRANSACTIONS IN AN OBJECT-ORIENTED ENVIRONMENT

[75] Inventors: Michael Dennis McKeehan; Teresa Chung Kan, both of Rochester, Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,948

[22] Filed: May 31, 1997

[51] Int. Cl.[7] .................................................. G06F 9/00
[52] U.S. Cl. ........................................ 709/101; 707/103
[58] Field of Search .................................. 395/671, 683, 395/680; 709/101; 707/201, 202, 103

[56] References Cited

U.S. PATENT DOCUMENTS 5,261,089  11/1993  Coleman et al. ........................ 395/600
5,363,121  11/1994  Freund .................................... 395/600
5,432,926   7/1995  Citron et al. ............................ 395/575
5,561,797  10/1996  Gilles et al. ............................ 395/600

OTHER PUBLICATIONS

Goupe Bull, IBM Corporation. "Object Transaction Service", Aug. 9, 1994.

*Primary Examiner*—Alvin E. Oberley
*Assistant Examiner*—Lewis A. Bullock, Jr.
*Attorney, Agent, or Firm*—Lawrence D. Maxwell

[57] ABSTRACT

A system, method, and apparatus for ensuring data integrity in a distributed object-oriented transaction processing environment, including support of single- and two-phased commit protocol transactions with a new protocol defined as a mixed-phase commit protocol. A root transaction manager on a server registers distributed object resources requested by a client application for a global transaction as being committable by either the single-phase, two-phase, or mixed-phase protocol. The root transaction manager commits the registered resources in accordance with the results of the registration step.

23 Claims, 11 Drawing Sheets

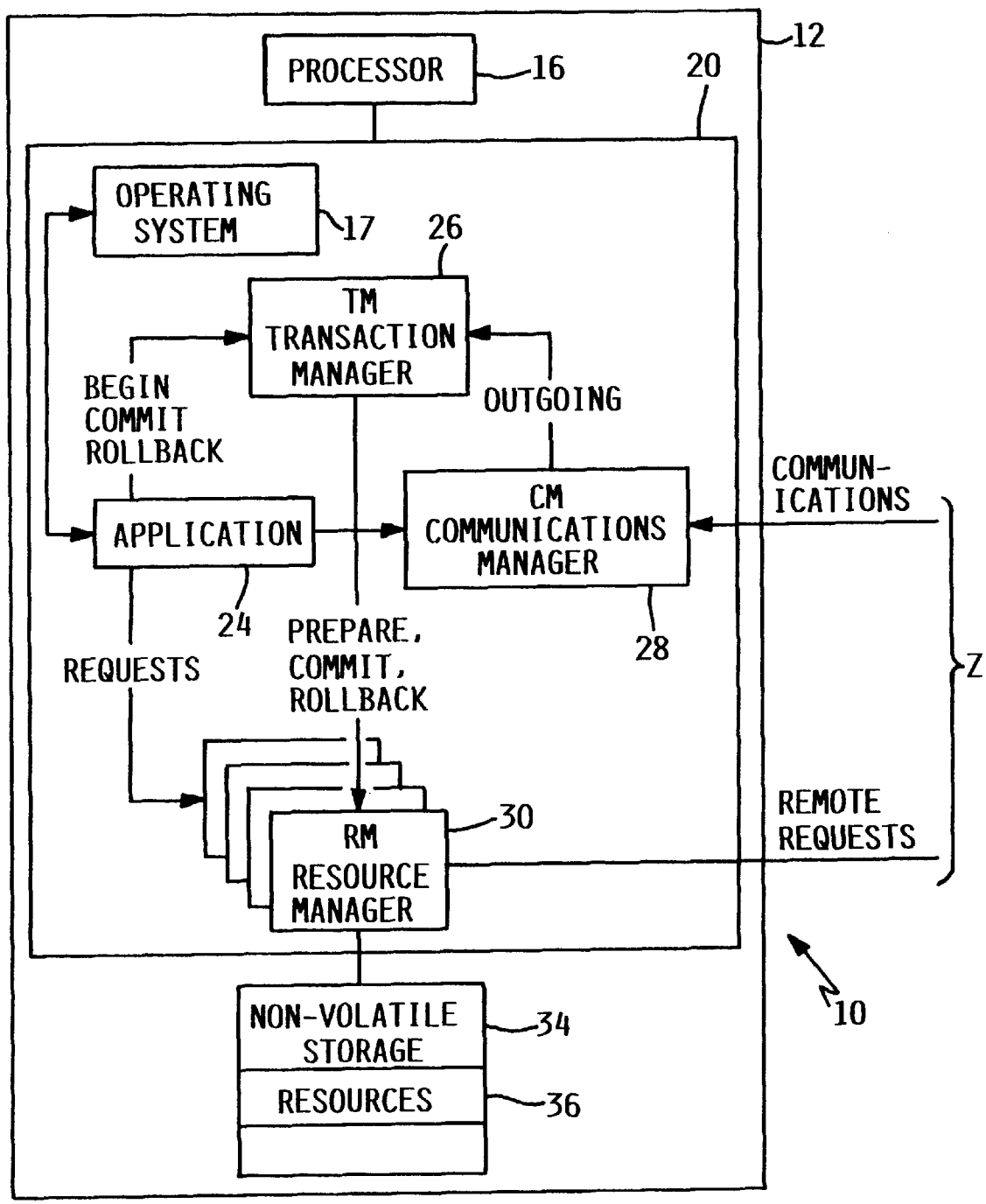
FIG. IA (PRIOR ART)

SYSTEM AND METHOD FOR SUPPORTING MIXED-PHASE TRANSACTIONS IN AN OBJECT-ORIENTED ENVIRONMENT

BACKGROUND OF THE INVENTION

1. Field of the Invention

The present invention relates generally to supporting transactions in in a distributed object-oriented computing environment, and more specifically to a system and method implemented in such an environment for supporting commit procedures selectively according to a single-phased commit protocol, a two-phase commit protocol, or a mixed-phase commit protocol.

2. Description of the Related Art

In a general sense a transaction in a computing environment is an exchange between one computing entity and another that accomplishes a particular action or result. For example, the entry of a customer's deposit and the updating of the customer's balance is a single transaction from the customer's point of view but involves a group of changes by an application transaction program that handles the transaction. One or more application transaction programs must interface with database files, referred to as resources, that have their own management software (resource managers) to access data and make changes to it. A procedure having specific rules, known as a commitment control protocol, ensures that a group of changes made to different database files, such as the above-referenced deposit and balance files, are synchronized so that multiple files all reflect the transaction.

It is estimated that, by the year 2000, business worth 600 billion dollars will be transacted over the Internet alone. This trend toward ever-increasing electronic commerce means that more resources will be distributed over networks globally accessible over the Internet, and continue to be spread over local area and wide area networks. Typically, in distributed computing environments, the commitment control procedure requires that each piece of transaction management software synchronize with the other transaction management software involved in the encompassing transaction taking place over the network. This synchronization ensures that data is not changed in any databases until all are in agreement that the change will be considered permanent.

The synchronization ensures the integrity of business processes and data by enforcing an "all or nothing" methodology. Each transaction is processed in its entirety, or not at all. This is sometimes referred to as atomicity. If a failure occurs during processing, the synchronization protocol will recover to the state before the request arrived, allowing the transaction to be retried if appropriate. The specific mechanism enforcing this behavior is a software component known as the transaction manager. When an application accesses multiple resources such as files, databases, and message queues, the transaction manager co-ordinates the updates to these resources, ensuring that either all updates are performed together or none are performed. It uses a method known as the two-phase commit procedure to achieve this. The two-phase commit procedure includes a voting phase in which resource manager indicates that his resource is prepared to commit, and a commit phase indicating that the data has been changed or updated. If the voting phase indicates a problem the data is not committed and the transaction does not occur.

A transaction manager component exists for each system that manages a resource along with resource management software that is responsible for managing the resource. The transaction manager is the controlling entity of the two management software entities. Not every transaction manager and resource manager has the capability to support such a two-phase commit protocol and may handle transactions using only a single-phase protocol. A single-phase protocol includes a Commit phase, and Rollback phase, but does not include a voting or Prepare phase. A peril with a single-phase commit protocol occurs if it is involved in a global transaction in a distributed environment. The single-phase system may commit its resource data to permanent storage, before another system commits, and if the other system's operation is interrupted, for example by a power outage, when it returns to a powered-on state it has data that is related to the first system's data but which is no longer in synch. In other words, the single-phase system has committed the transaction, but the two-phase system has not. Had a voting stage been implemented on both systems, the transaction would probably not have been committed because one would have been unprepared. Thus, allowing a single-phase commit protocol to be used in a distributed transaction has typically represented a degree of risk that negatively compromised data integrity, and the ability to provide ACID properties. For this reason, in a prior art distributed computing environment a resource that can be committed without the voting phase (i.e, a single-phase) is typically not allowed to participate in the transaction by the transaction management software controlling the encompassing transaction. An alternative prior art solution for handling such a situation is to eliminate the synchronization of the voting phase between resource sites, and allow each phase to operate on single-phase, but this solution carries the risk of the data being out of synch.

The above-described problem becomes even more complicated in a distributed "object-oriented" environment. Objects are becoming very popular with computer programmers because their use can greatly reduce software development time and expense. In object oriented programming, program code may be inherited from objects as long as there is an underlying system, sometimes referred to as a framework that supports the objects and allows the inheritance to take place. The object is said to encapsulate or contain properties such as certain executable code and data that is consistently reusable whenever a procedure or method is performed on the object. To ensure that they retain their properties, objects need to be saved in non-volatile locations, such as disk storage, where they are managed by resource management software, such as a relational database manager or object database manager. This is referred to as persisting the object. Thus, an advantage of objects is that one representation of an object persisted in disk memory may be used by various sites' application programs.

A disadvantage for the programmer who is concerned with ensuring the integrity of distributed transactional data involving objects, lies with the difficulty of determining what commitment procedure or protocol is supported for each object-related resource involved in the transaction before the transaction begins. In a distributed object environment, a transactional application program may not have any information regarding where objects are physically persisted. The object may be persisted on the same or different system as the application code. The software responsible for managing the object or resource may provide a commit protocol that synchronizes with other resource management software or it may not. This leads to the problem described above, where different commit protocols are being used for different resources involved in a transaction.

A solution for handling distributed transactions in which both single-phase and two-phase commit protocol support exists at different respective sites is proposed in U.S. Pat. No. 5,561,797 to Giles et al. assigned to the assignee of this invention. The solution does not offer management of object resources in an object-oriented environment, but rather focuses on a procedural database environment. In such an environment, the problem of determining where data resources can be expected to be accessed is more predictable and therefore can be managed differently than an object-oriented environment.

What is needed is a way to synchronize data in a distributed transaction environment that allows each resource requested by a transaction application program to be involved with the transaction, and which allows particular software managing a corresponding particular resource to employ its normal commitment procedure to finalize the transaction and ensure data integrity. Moreover, such a mechanism is particularly needed for distributed transactions involving distributed objects.

SUMMARY OF THE INVENTION

An objective of this invention is to ensure data integrity in a distributed object-oriented transaction processing environment.

A further objective of this invention is to provide such data integrity in such an environment wherein objects requested by a client application are distributed among a plurality of servers.

A still further objective of this invention is to meet the above objectives when the location of the objects requested by a client application is unknown when the client application is programmed, and therefore the commit protocol used for committing each of the requested objects is also unknown.

It is yet another objective of this invention to meet the above objectives when the normal commit protocol used to commit objects requested by the client application is a single-phase protocol on at least one of the servers of the plurality of servers and the normal commit protocol used to commit objects requested by the client application a two-phase protocol on at least one other of the servers of the plurality of servers.

To meet the objectives described above, and to overcome the problems described above, and those which will become apparent upon reading the detailed description below, a new system and method is provided, wherein the system includes an object resource registration and commit method that operates in a distributed object-oriented transaction processing environment. The system includes a transaction manager on a first server that selectively registers and commits the distributed object resources requested by a client application for a global transaction. The resources are selectively registered by the transaction manager as being committable by either a single-phase, two-phase, or mixed-phase protocol and are selectively committed in accordance with the results of the registration step.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings in which identical numbers in various views represent the same or similar elements, and wherein.

DESCRIPTION OF PREFERRED EMBODIMENTS

The present invention is described in a preferred embodiment as being computer software. Nevertheless, in view of the teachings herein, it will occur to those skilled in the art that all or portions of the invention, and in particular that identified herein as computer-executable logic, may be implemented in computer hardware or a combination of hardware and software (i.e., firmware), as well as being implemented as computer software.

The present invention includes a computer system and a procedure, preferably implemented with computer software, that employs a mixed-phase commit procedure or protocol for supporting the integrity of data involved in a distributed object-oriented transaction processes environment.

Single-phase and Two-phase Commit Protocols for Distributed Transactions

Figure 1B:
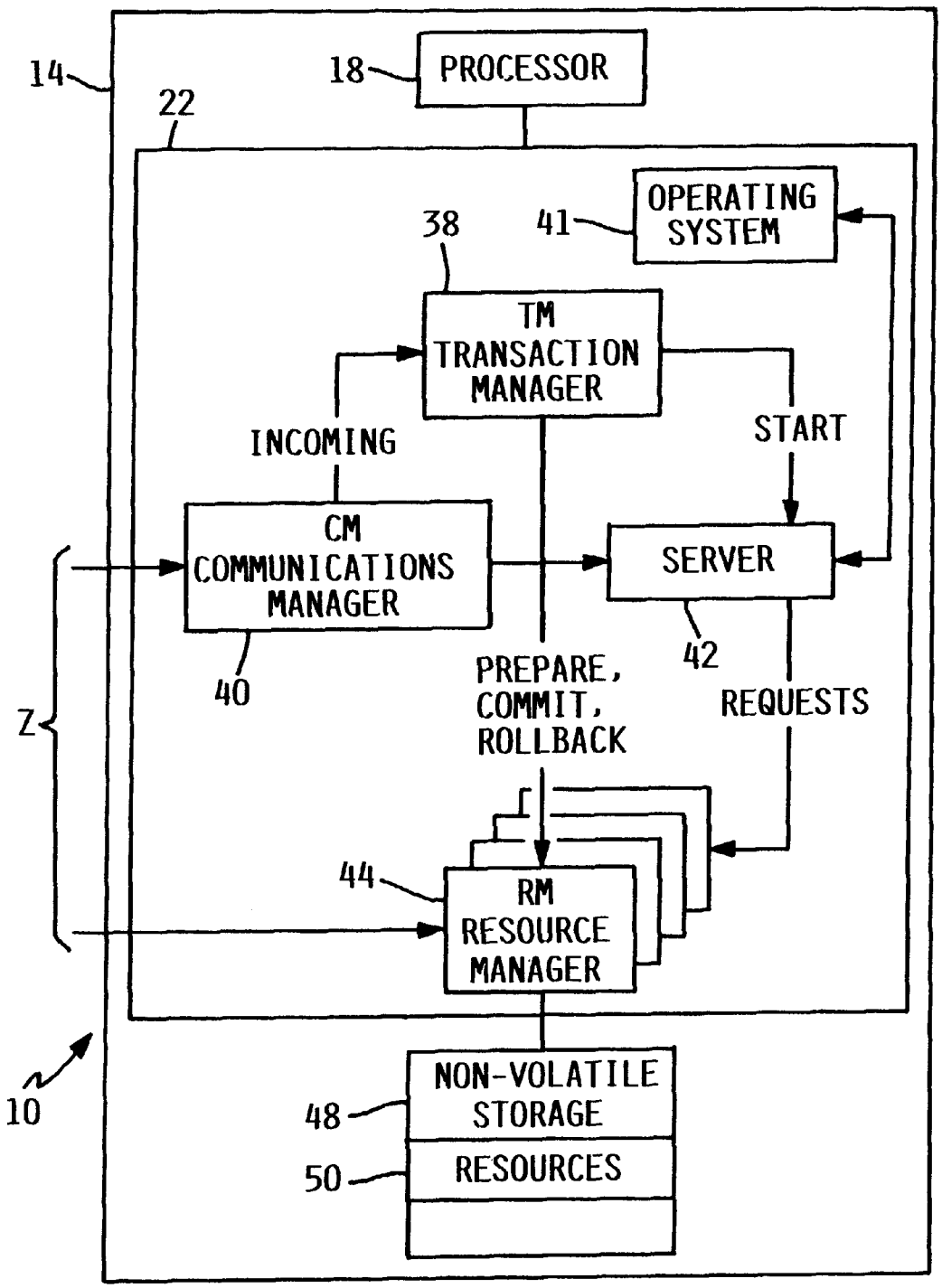
FIG. 1 is a simplified overview of a prior art distributed transaction computing environment over which the invention offers improvement.
Figures 1, 2A:
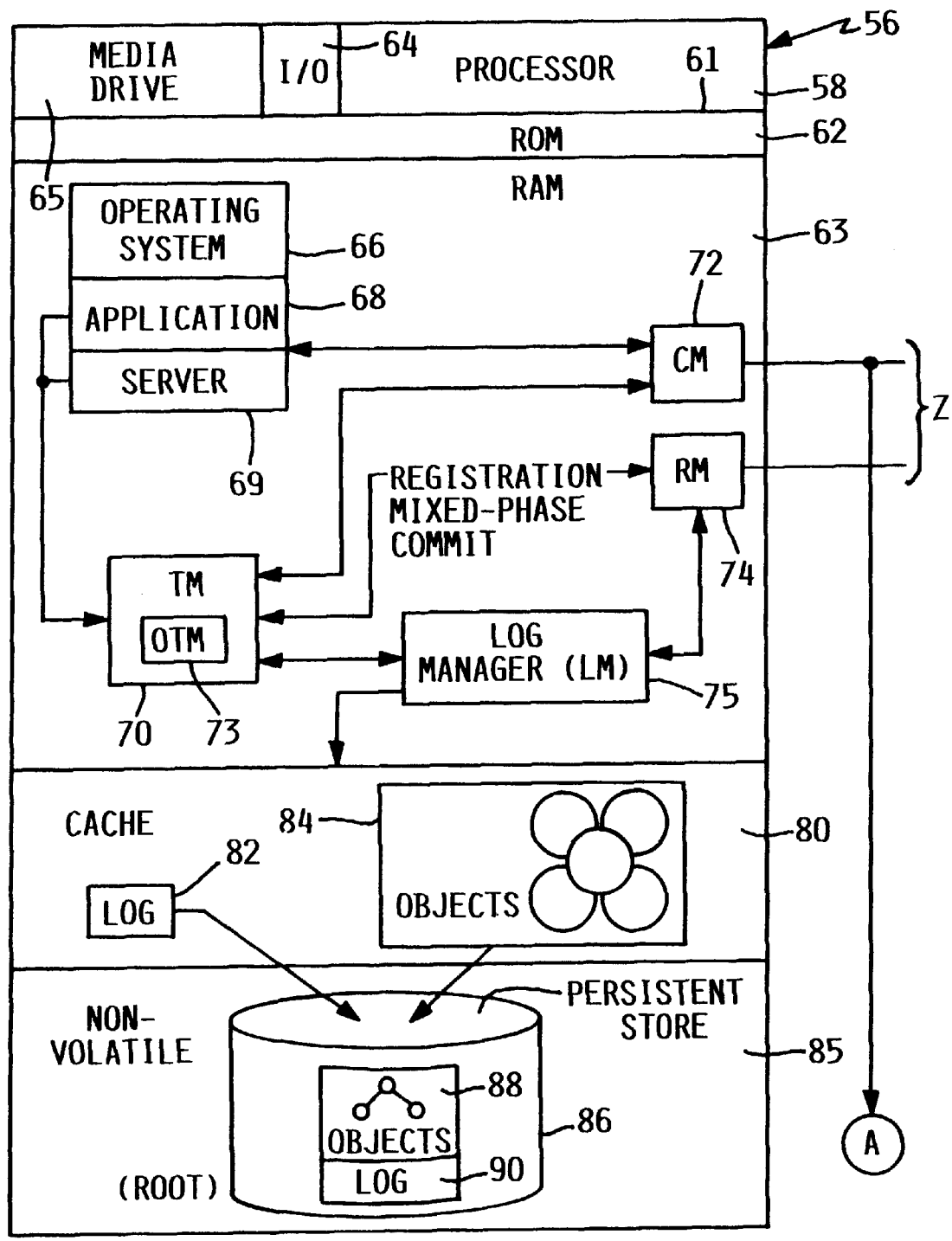
FIGS. 2A and 2B together show a simplified block-diagram of a distributed transaction object-oriented computing environment in which the present invention is useful.
Figures 2, 2A:
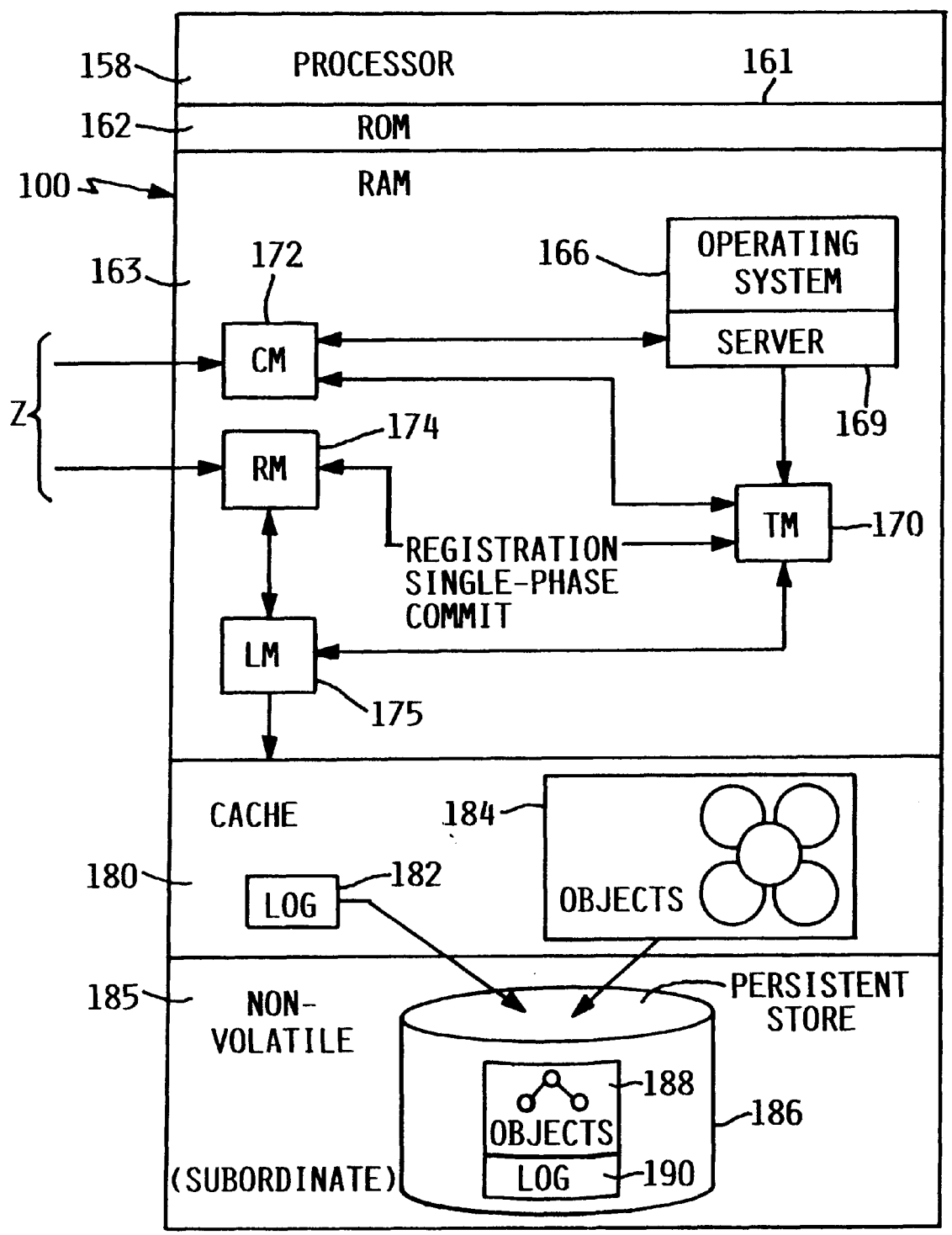

FIG. 1 shows a prior art distributed transaction environment, for which transaction-related improvements are provided by the present invention and which are discussed below. Generally speaking, a transaction is defined in the well-respected work, *Transaction Processing, Concepts and Techniques*, by Jim Gray and Andreas Reuter, ISBN 1-55860-190-2, as a collection of operations on the physical and abstract application state. In that regard, with reference to FIG. 1, a global transaction in distributed transaction computing environment 10 refers to a transaction involving data resources throughout the distributed environment. In this environment, a global transaction comprises a unit of work that consists of operational execution by transaction application program (application) 24 initiated with a Begin__ Transaction, i.e. begin transaction operation. The transaction may include reading or modifying the data resources 36, and 50 involved in the transaction, and stored on non-volatile storage 34 and 48 respectively. The non-volatile storage may be for example well-known disk storage.

The application program, as well as various other programs, described in detail below and including transaction manager (TM) 26, Communications Manager 28, and Resource manager 30 operate in random access memory (RAM) 20 which operates under control of a processor 16 communicating with an operating system 17 in random access memory 20. RM 30 controls access to resources from and to storage 34, and CM 28 handles communication with computer system 14 by communicating with CM 40. System 14 includes RAM 22, in which operates a similar operating system 41, TM 38, CM 40, and RM 44. It also includes a Server program 42 for responding to client-requests to its RM 44 from RM 30 of system 12. RM 44 manages resources on nonvolatile storage 48, which may also be well-known disk storage.

The TM 26 receives the Begin_Transaction request from Application program 24 that initiates the transaction, and it ends with either a Commit or Rollback operation. A Commit operation signals successful termination of a transaction, while a Rollback operation denotes unsuccessful termination of a transaction due to abnormal circumstances.

The Commit and Rollback operations are employed to ensure that the transaction has atomic, consistent, isolated, and durable (ACID) properties. Atomicity means that changes to the state of resources involved in a transaction either all occur or none of them occur. Accordingly, a transaction either succeeds or fails. If it succeeds, the results of the transaction are made permanent (committed). On the other hand, if the transaction fails, all effects of the unsuccessful transaction are removed (backed out). For example, a banking debit transaction is atomic if it both dispenses money and updates your account (all changes to the resource occur). Consistency means that a transaction is a correct transformation of state. Returning to the example, the banking debit transaction is consistent if the money dispensed is the same as the debit to the account. Even though the transactions execute concurrently, it must appear to each transaction that it is acting in isolation. In other words, the application 24 must be unaware of other programs reading and writing the account (resource) concurrently. For example, the banking debit transaction must be unaware or isolated from a concurrent deposit that a joint owner is making to the account. Finally, Durability ensures that once a transaction completes successfully (i.e., Commits), its change to the state of the resource survives failures to system 10. For example, if the transaction is durable, once it is complete, the account balance reflects the withdrawal, even if system 10 fails.

The Commit Procedure is the primary mechanism for the TM to enforce ACID properties on transactions. The Transaction-oriented systems include recovery procedures that are part of TM 26 that maintain the ACID nature of transactions and re-establish system operation after failure. TM 26 has primary responsibility for managing the transaction because it received the application's request to begin a transaction first, i.e. before any other TM in the environment.

In a transaction-oriented system 10, transactions may occur either on a single computer system, such as system 12 independently, or on a distributed basis, on both system 12 and 14. Where transaction operations are executed at only one site during any transaction, transaction ACID properties are enforced by a single-phase synchronization operation. In this regard, when the transaction is completed, the application 24 requests that all changes be made permanent to the resource occurring during the transaction. In response, the TM 26 and RM 30, in a single-phase, either Commit or Rollback to obviate any changes, TM 26 keeps up with whether a Commit or Rollback occurs.

In a distributed transaction encompassing resources on system 12 and 14, a transaction may cause changes to be made at more than one site. In such a system, atomicity can be guaranteed only if all of the sites involved in the transaction agree on its outcome. As described in the above-referenced *Transaction Processing* textbook, distributed transaction systems can use a transaction synchronization procedure called two-phase commit protocol to guarantee atomicity, and the other ACID properties.

Following is an example to illustrate the two-phase commit protocol. When a transaction ends successfully at execution site 12 executing such a two-phase commit protocol, TM 26 requests that all resource management software, i.e. RM 30 and 44, commit or make permanent all data operations involved in the transaction. In the first phase of the protocol, RM 30 and 44 are requested to prepare to commit. In response, each RM individually decides or "votes", based upon local conditions, whether to Commit or Rollback out their operations. The decisions are communicated to a synchronization location where the "votes" are counted. In the second phase, if all sites vote to Commit, a request to Commit is issued by the transaction manager, in response to which all of the RM's commit their operations. On the other hand, if any site votes to Rollback or back out of its operation, all sites are instructed to Rollback their operations and the transaction does not occur. Thus, the ACID properties are ensured throughout the distributed environment.

A problem, to which the present invention is directed to solve occurs when a two-phase protocol is supported at one or more sites in an object-oriented distributed computing environment, but not supported at least one other site that has a resource that is related to an encompassing transaction in the environment. For example, if a first update site supports only a single-phase commit protocol, while a second site supports a two-phase protocol, commitment at either site cannot be undone if it precedes Rollback at the other. Moreover, the failure of a site, not supporting the two-phase protocol to vote, may result in an aborted transaction because the transaction manager acting as the master of the entire transaction will treat this the same as a vote against committing the transactional operation. One prior art solution for these problems is to limit transactions to updating only a single site in all cases. Another prior art solution is to exclude the site supporting only a single-phase commit from participating in the transaction. However, the first prior art solution sacrifices the speed and flexibility inherent in a distributed system, and the second limits participation in the transaction.

Overview of Operation of Present Invention

The present invention addresses the above-described problem directly by providing a mechanism for supporting either a single-phase, two-phase, or the new mixed-phase protocol in a distributed object-oriented transaction computing environment. The new mixed-phase protocol is supported by the new transaction manager of the present invention. This mixed-phase protocol allows a transaction application program to perform transaction operations on objects that are persisted (i.e., permanently save) to a plurality of distributed storage systems, some of the plurality supporting the known single-phase protocol and others supporting the known two-phase protocol.

The invention provides the ability for an administration to pre-configure which commit protocol (single-phase, two-phase, or mixed phase) is being used. As explained below, the transaction manager of this invention uses the global commit configuration information to determine what type of registration is allowed.

Computer System for implementing the Invention

Figures 1, 2B:
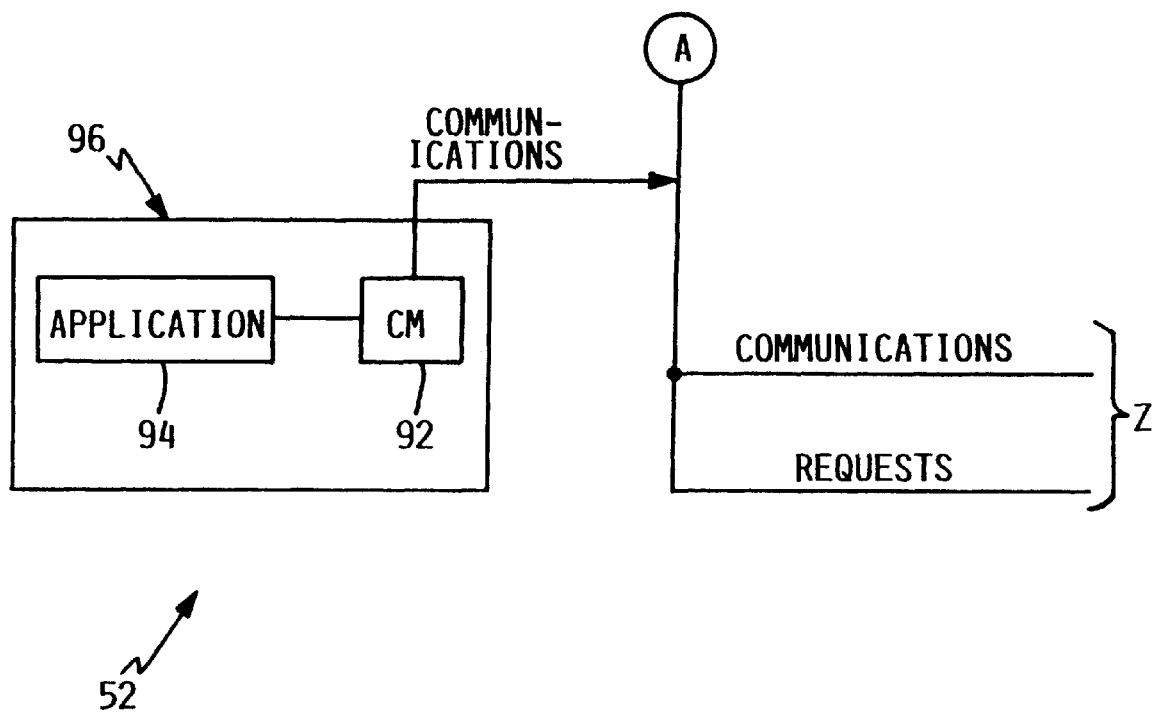
Figures 2, 2B:
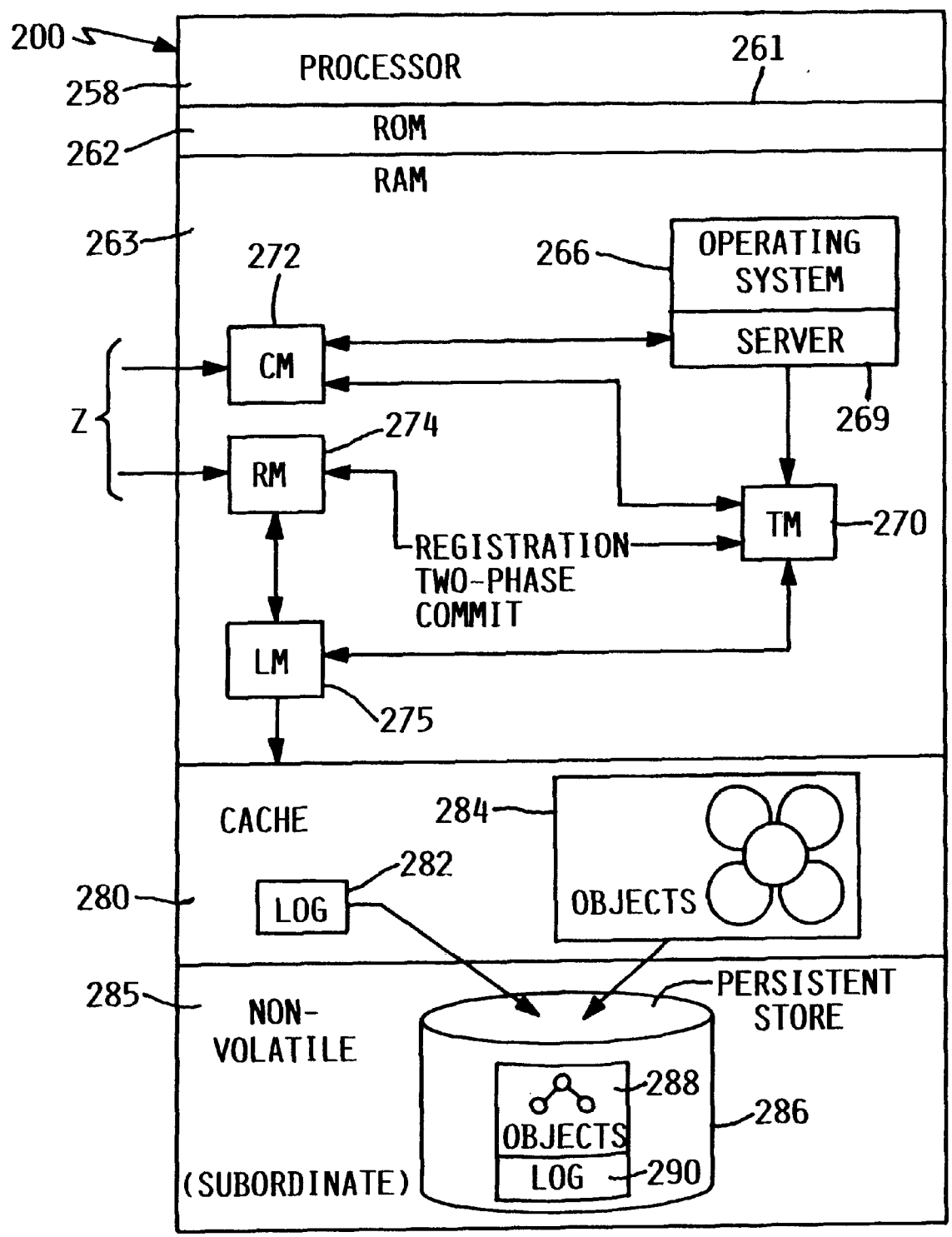

FIGS. 2A and 2B together show a simplified block-diagram of a distributed transaction object-oriented computing environment 52 in which the present invention is useful for overcoming the problems and providing the advantages described above. In general, computer system 56 (FIG. 2A) is configured with the transaction manager (TM) 70 of the present invention, which includes for the first-time an object transaction manager (OTM) 73 which is capable of supporting mixed-phase (i.e., both single-phase and two-phase) commit protocols existing on separate systems for one global transaction operating on computer system 56, 100, and 200. This is important because the programmer of an application 68 operating on system 56, or an application 94 (FIG. 2B), operating on simplified computer system 96 has no way of knowing the location of distributed objects that may be requested by the application program from the server service 69 on computer system 56. Either application program may invoke a Begin_Transaction command to server program 69 that invokes its transaction manager 70 to carry out the global transaction in the networked environment 52. When such a command is received at site 56, that site is designated by TM 70 as the Root server, and all other servers, i.e. computer systems 100 and 200, involved in the global transaction become Subordinate servers to the Root server. System 100 (FIG. 2A) supports a single-phase commit procedure, and System 200 (FIG. 2B) supports a two-phase commit procedure, but for the first time in a distributed object-oriented transaction computing environment, resources existing on either machine may fully participate in the global transaction due to the methods enabled by the new logic of this invention, discussed in more detail below.

Computer system 56 includes a processor 58, main memory 61, and durable or non-volatile storage, e.g, disk storage. Computer system 56 may be a well-known personal computer, such as those manufactured by IBM Corporation, or a mid-range computer, such an IBM AS/400. Accordingly, the processor 58 may be a microprocessor, such as the Intel Pentium, or a proprietary processor for such a mid-range computer as the IBM AS/400. Media drive 62 is useful for allowing computer-readable data mediums to be used to communicate with processor 58. Such media drive, may include tape drives, optical media drives, such as CD-ROM drives, and well-known floppy diskette drives. Input/Output 64 may be used to communicate with peripheral devices, such as a keyboard, mouse, or display (not shown). Main memory 61 may include read only memory (ROM) 62, and random access memory (RAM) 63, and cache memory 80. Of course, Main memory 61 is shown in simplified arrangement, and it should be understood that it may also include other well-known memory, such as DRAMS and flash-memory. Cache memory 80 holds certain data, according to well-known memory-allocation algorithms, such as least recently used, for quick access before physical writing to non-volatile memory 85. Non-volatile memory 85 refers to the physical data storage in which logical data, including a logical persistent store 86, is stored for purposes of being able to recover data, including object cluster 88 (a group of one or more objects), upon transactional or system failure. A log 82 in cache and its sibling persistent version 90 in the persistent store 86 is used by log manager (LM) 75 to track whether objects 84 have been written to persistent store 86 and become part of object cluster 88.

Generally, the transaction manager and the resource manager store the persistent state of objects 80 in volatile cache memory. Changes made to an object resource are recorded in the log. Most of the log is kept in non-volatile memory. However, a global transaction altering many objects at many nodes can generate log records in many different logs. The first transaction manager to receive an application's request tracks the resource managers and remote transaction managers used by each transaction. It invokes them at transaction commit and rollback.

An operating system 66 may communicate and manage lower-level operations with programs, such as application program 68, and server program 69, and TM 70 through known means, including known application program interfaces (APIs) not shown. Operating system 66 may be OS/2, AIX, Unix, Windows-NT, or other well-known operating systems for personal computers and OS/400 for an IBM AS/400.

Computer systems 100 and 200, may be similar systems to computer system 56, but for simplicity some components shown on system 56 are not shown on those respective systems. Thus, processors 158, and 258, main memories 161 and 261 including ROM's 162, 262, RAM's 163, 263, and cache memory 180, 280, respectively, are also similar to those described above with reference to processor 58, and main memory 61. The handling of objects 184 and 284 through cache 180 and 280 and the respective storing of objects to object clusters 188, and 288, respectively, to persistent stores 186 and 286, respectively, is the same as described for the similarly numbered and denominated elements of system 56. Each persistent store is part of respective non-volatile stores 185 and 285 which are durable storage, such as disk memory are tracked by logs 182 and 282 in respective cache memory, and by persistently stored log 190 and 290 in the disk memory in the same way as described above for the respective similarly numbered and denominated elements of system 56. The logs are managed by respective log managers 175 and 275 on systems 100 and 200, respectively.

Operating systems 166 and 266 operate in the same way and may be embodied in the same way as that described above for operating system 66 of computer system 56, described above. The only important difference between the systems 100, and 200, is that the OS 166 in system 100 only supports a single-phase commit procedure, and therefore its resources are non-recoverable to the same state as resources on system 200, on which OS 266 supports a two-phase commit procedure in a global transaction. In a typical prior art object-oriented distributed environment, resources on system 100 would not be included in a global distributed transaction with such a system as system 200 having the ability to follow a two-phase commit procedure, because of the perils described above. Namely, because system 100 only supports a single-phase commit procedure, it lacks a Prepare (vote) stage before committing, and therefore there is a risk of its data being out of synch with other systems involved in a global transaction in the distributed environment. Such an erosion of desirable ACID properties is a reason for excluding resources on system 100 from participating in such global transactions in typical prior art distributed object-oriented transactional systems.

The present invention provides a mechanism to allow resources supported by either single-phase or two-phase commit protocols to participate in the same global transaction, by the implementation of a new "mixed-phase" commit procedure. The mixed-phase commit procedure is enabled by the Object Transaction Manager (OTM) 73 on TM 70 of system 56. Although the risk of including single-phase resources is not entirely eliminated, the risk can be identified before data is committed, and thus can be handled in the event of failure. It can be identified because the OTM registers each resource according to the commit protocol supporting each resource, before any committing of the transaction is allowed to occur. Because the OTM 73 includes the ability to register each resource, it is not necessary for the application programmer to know where desired objects are located. Importantly, this shields an application programmer for application 68, for example, from having to know where objects requested by the application through resource managers 74, 174, and 274, respectively are located in environment 52. Thus, the desired ACID properties are maintained and the transparency of location is also maintained while allowing all resources needed for the transaction to be accessed.

Regarding terminology, the interaction between the respective resource managers and the transaction managers is similar as that described with reference to FIG. 1, but since the OTM provides the services for supporting the mixed-phase protocol, all commit actions will be considered to have occurred because of TM action rather than RM action. Further regarding terminology, the functional logic is preferably embodied as software and is referred to in some portions of this specification as being grouped in "modules." Nevertheless, one skilled in the art will recognize that any grouping or, on the other hand, parsing of the functional logic is within the scope of this invention.

TM 70 communicates with Communication Manager (CM) 72 which in turn communicates with CM's 172 and 272. The CM's 172 and 272 are primarily responsible for communicating with the respective server programs 169 and 269, respectively. Each CM also communicates with the respective TM's 170 and 270 on respective systems 100 and 200. Each Server program 169 and 269 also communicates with each respective server program on each respective system. TM 170 and 270 are considered Subordinate to Root TM 70, which is responsible for determining which resources may participate in a global transaction that is initiated by an application program, such as application program 68, or 94. The Root TM is determined as the first Server program including a TM in the network contacted by such an application program. If the application program 94 initiates the transaction, then its CM 92 must communicate this to CM 72 of system 56. The purpose of showing more than one application program is to illustrate that the application program may reside anywhere in the network.

Figure 3:
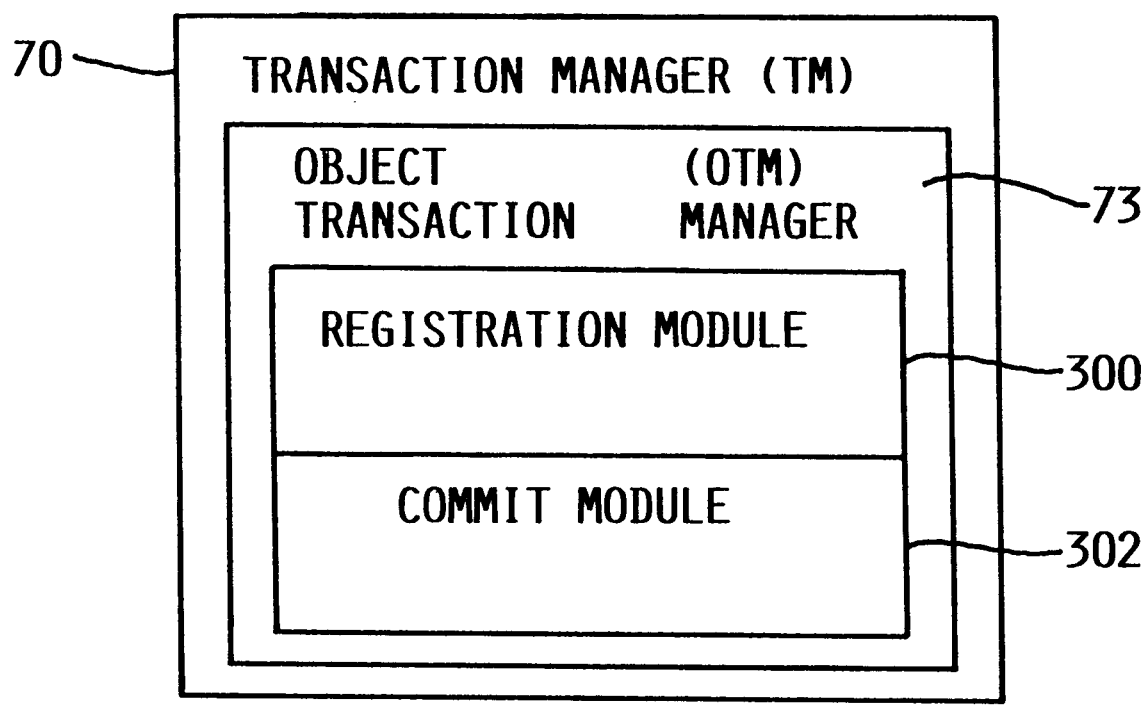
FIG. 3 is a simplified block-diagram of the logic of the transaction manager including an object transaction manager module that operates within the computing environment of FIGS. 2A and 2B.
Figure 4:
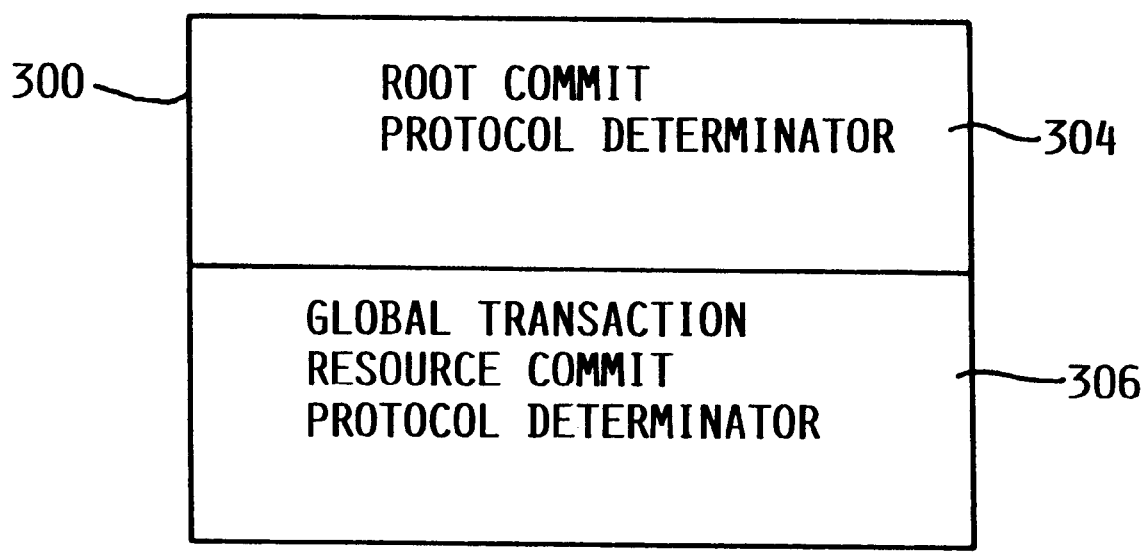
FIG. 4 is a simplified block-diagram of the logic of the registration module of the object transaction manager module of the transaction manager of FIG. 3.
Figure 5:
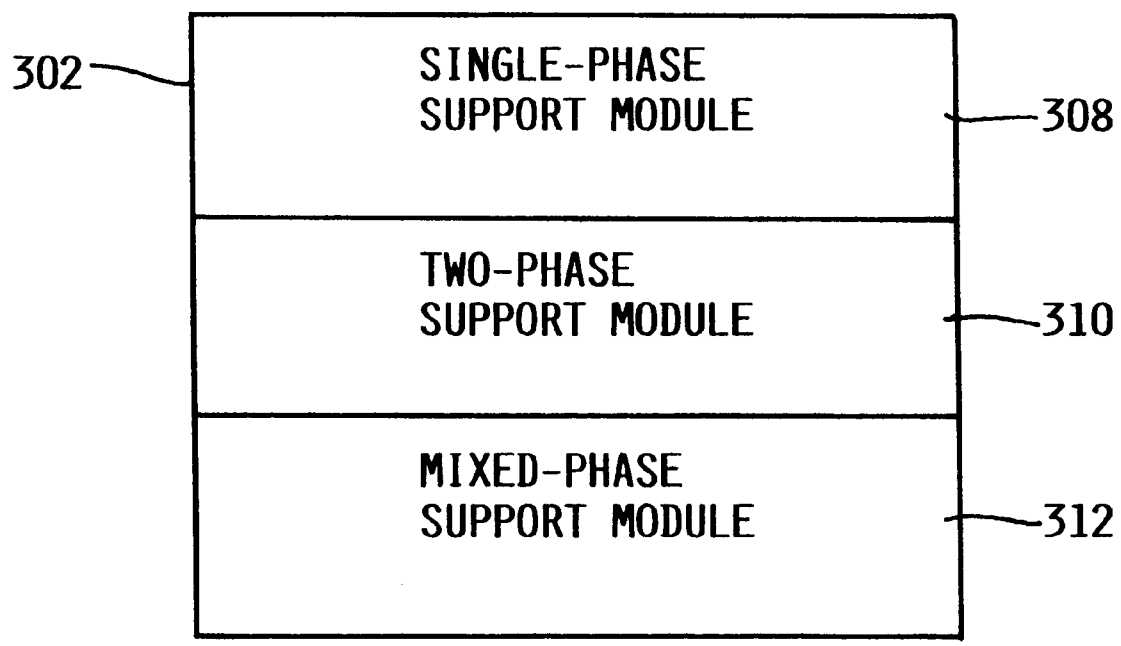
FIG. 5 is a simplified block-diagram of the logic of the commit module of the object transaction manager module of the transaction manager of FIG. 3.

Referring now to FIGS. 3, 4, and 5, the TM 70 includes an object transaction manager (OTM) module 73, which itself includes a registration module 300 and commit module 302. The registration module includes a Root commit protocol determinator 304 and a global transaction resource commit protocol determinator 306 (FIG. 4). The method processed by the registration module is described below with reference to FIG. 6. The commit module 302 includes a single-phase support module 308, a two-phase support module, and a mixed-phase support module, that carry out the method shown in FIG. 7. The OTM is preferably implemented in software code, and in particular, in a software language suitable for object-oriented programming, such as the well-known Java language. Those skilled in the art of object-oriented programming, with knowledge of such languages as object-oriented languages as Java, will be able to make and use the invention in view of the description of the modules of the OTM combined with the process flow diagrams of FIGS. 6 and 7.

Registration and Commit Procedures

Figure 6:
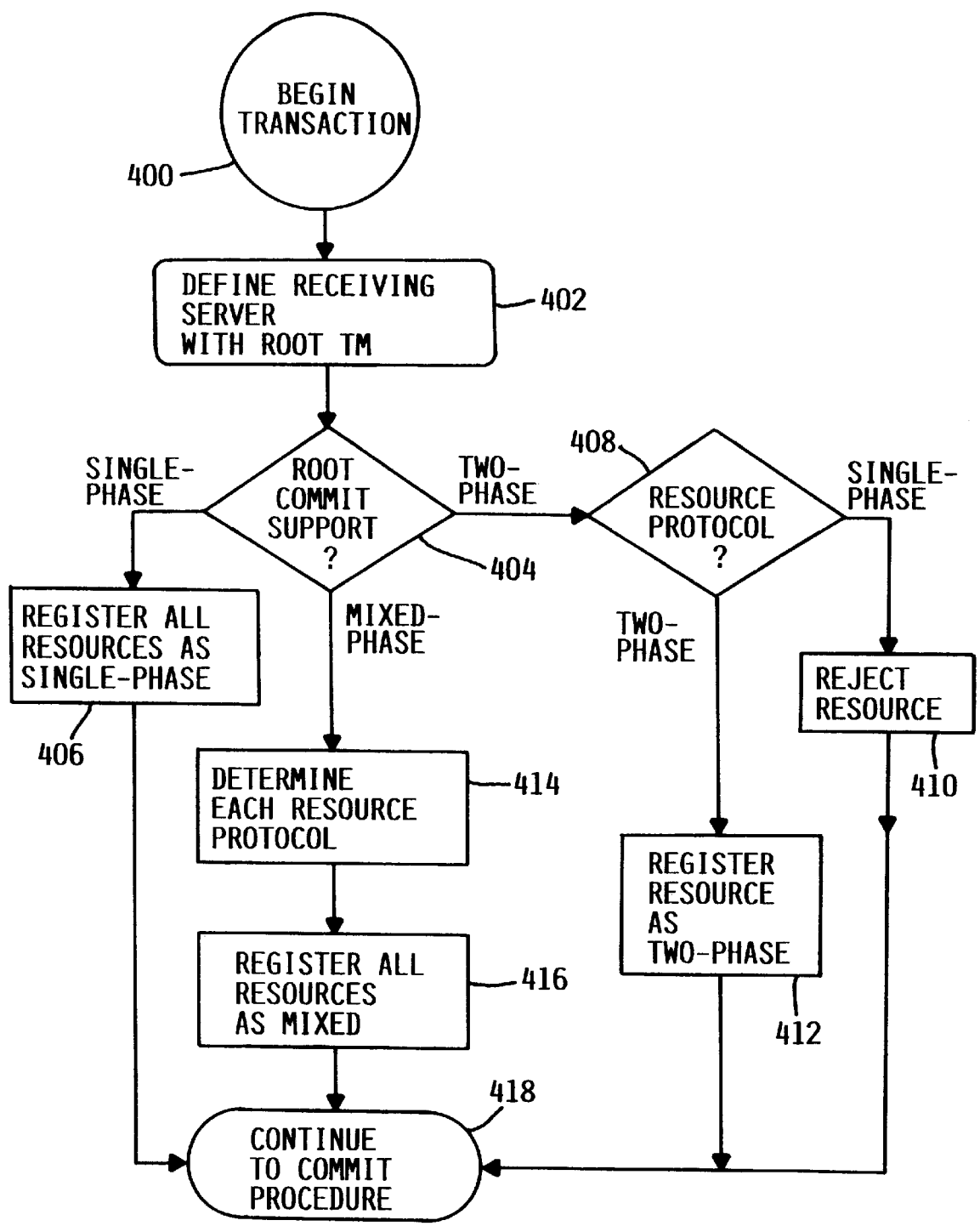
FIG. 6 is a flow-diagram of the method of registering resources for participating in a global transaction in the distributed transaction object-oriented computing environment of FIGS. 2A and 2B with the logic of the object transaction manager module shown in FIGS. 3, 4, and 5.
Figure 7:
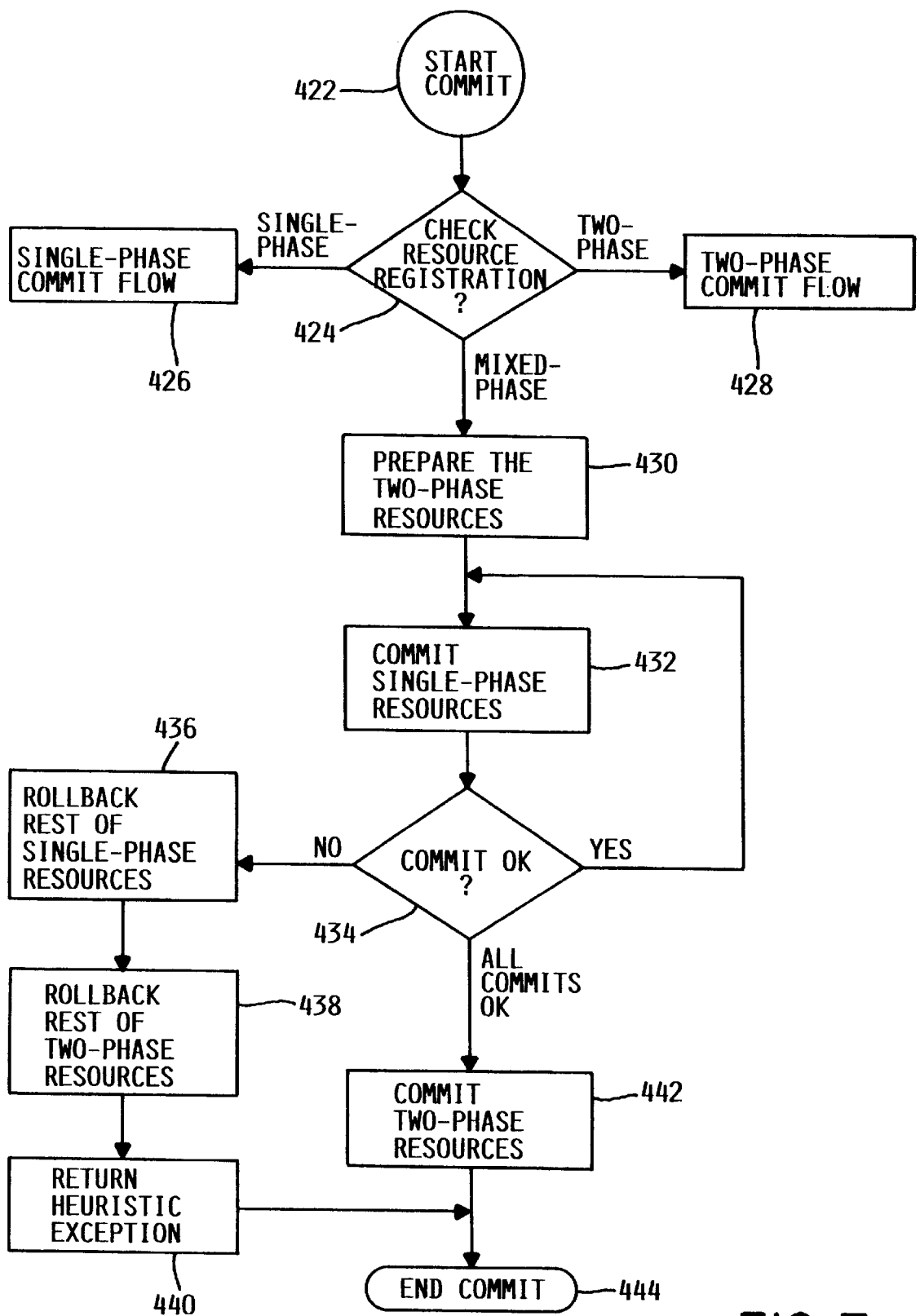
FIG. 7 is a flow-diagram of the method of carrying out the commit procedure for each resource registered to participate in the global transaction, in accordance with the method of FIG. 5 within the distributed transaction object-oriented computing environment of FIGS. 2A and 2B with the logic of the object transaction manager module shown in FIGS. 3, 4, and 5.

Referring to FIGS. 6 and 7, the method of this invention including the registration process carried out by the registration module 300 and the commit process carried out by the commit module 302 is shown. A global transaction begins with the command Begin_Transaction in step 400 (FIG. 6) by either Application Program 68 (FIG. 2A) or Application Program 94 (FIG. 2B). The begin command is received by CM 72 (FIG. 2A) and passed to Server Program 69, and RM 74. The site is now considered the root server. TM 70 is registered as the root transaction manager, in step 402. Although the TM 70 and RM 74 are capable of supporting a mixed-phase commit protocol, in a preferred embodiment, the OTM 73 enables the administrator to configure the system 56 to handle transactions according to either a single-phase, two-phase, or mixed-phase (both single- and two-phase) procedure. Thus, in step 404, the procedure for the Root is checked. If it is single-phase, then in step 406, all resources that will participate in the transaction are registered as single-phase. In such a case, object resources 184 are of course registered as single-phase, but even the resources of objects 284 managed by TM 270 and RM 274 which are equipped to commit resources in accordance with a two-phase commit process are registered as single-phase resources.

If the Root's commit procedure supports a two-phase commit protocol, then the commit protocol for each resource involved in the global transaction is checked, in step 408. This may be done by checking a configuration file at the resident system, such as system 100 or 200, or by having RM 74 dynamically issue a commit flow , e.g. the two-phase flow, Prepare, Commit, and Rollback to TM 170 and RM 174, and TM 270 and RM 274 to determine what commit flows the system including each supports. In any case, if the system supports two-phase commit flows then the resource is registered as being committable by a two-phase commit protocol in step 412, or if it only supports single-phase flows it is rejected by TM 70 and not allowed to participate in the global transaction in step 410.

If the Root's commit procedure supports the new mixed-phase commit protocol, then the commit protocol for each resource involved in the global transaction is determined and recorded in a configuration file on system 56, in step 414. For this step, the commit protocol may be determined in the same way described with reference to step 408 above. All resources are registered at the root for mixed-phase but the type of commit protocol supported for each resource is also stored for later use in the commit procedure in FIG. 7 described below.

The commit procedure is shown in FIG. 7, and starts with step 422. The resource registration for the global transaction, determined in the steps of FIG. 6 is checked in step 424. In step 426, if the global resource registration is single-phase then single-phase commit flows are processed for each resource in the transaction, i.e. resources 84, 184, and 284, on systems 56, 100, and 200, respectively. In step 428, if the global resource registration is two-phase, then a two-phase commit flow is used to commit two-phase resources only, i.e. resources 84 and 284 only. However, if the global registration is mixed-phase, then a preparation of two-phase resources if performed in step 430. Any single-phase resources are committed in step 432. Step 434 is an inquiry to determine if the commit of the single-phase resources is okay. If the answer to the inquiry is "no" then in step 436 the uncommitted single-phase resources are rolled back. Following step 436, in step 438, any two-phase resources are also rolled back. In step 440, the TM 70 returns a heuristic exception to indicate that the commit has not occurred. Heuristic exceptions are known and described in the *Transaction Processing* textbook by Gray and Reuter described above. However, such heuristic exceptions for mixed-phase resources are heretofore unknown. Once the heuristic exception indicating that the commit is in doubt is given, then the commit procedure ends in step 444. Returning to the inquiry of step 434, if the answer is "yes" then the commit of the single-phase resources 432 is repeated until all single-phase resources are committed okay. When all commits are okay, then the two-phase resources are committed in step 442. The commit then ends in step 444.

It is well known with prior art systems that an administrator can configure which commit procedure is to be used for a global transaction. In view of the new mixed-phase commit procedure of this invention, the administrator may now configure for any of the three types of commit procedures, i.e., single-, two-, or mixed-phase. Thus, configuration information stored in non-volatile memory will indicate what commit procedure is to be used by the Root TM for a global transaction.

It should be recognized, employing the single-phase commit process as part of the mixed-phase commit protocol does not add the prepare phase to the single-phase flows, but some risk is removed because the OTM 73 allows the administrator to register all resources prior to the transaction commit process. By selectively including single-phased resources, the administrator is made aware of such a situation and knows the risk involved. He or she may then monitor the single-phase supported system's log and transaction manager, and intervene for the manual recovery of single-phase resources, such as those on system 100, in the event of system failure during the global transaction. Thus, for the first time, a mixed-phase commit procedure allows adherence to ACID properties in a distributed object-oriented transaction computing environment, so that single-phase commit procedures for committing object resources is not a bar to including such supported resources to be used in a global transaction in the distributed environment.

As described above, aspects of the present invention pertain to specific method steps implementable on computer systems. In an alternative embodiment, the invention may be implemented as a computer program-product for use with a computer system. The programs defining the functions of the present invention can be delivered to a computer via a variety of signal-bearing media, which may be recordable-type media and transmission-type media. Examples of recordable-type media include, but are not limited to: (a) information permanently stored on non-writable storage media (e.g., read-only memory devices within a computer, such as ROM 62 or CD-ROM disks readable by a media drive 65); and (b) alterable information stored on writable storage media (e.g., floppy disks within a media drive 65). Examples of transmission-type media include conventional computer, cable, or telephone networks, including wireless communications. Therefore, it should be understood that such signal-bearing media, when carrying computer readable instructions that direct the method functions of the present invention, represent alternative embodiments of the present invention.

Other embodiments and configurations may occur to those skilled in the art in view of these teachings. For example, the logic module may be implemented as hardware or a combination of hardware and software (i.e., firmware), rather than in the preferred embodiment of only software code. Therefore, the spirit and scope of this invention is not to be limited by anything other than the appended claims and their equivalents.

What is claimed is:

1. A method for supporting a plurality of different commit procedures in a distributed object-oriented transaction processing environment, the method comprising the steps, all performed within a single global transaction commit cycle, of:

a transaction manager on a first server selectively registering distributed object resources requested by a client application for a global transaction as being updateable and committable by either a single-phase, two-phase, or mixed-phase protocol, wherein the object resources are distributed among a plurality of servers including the first server, wherein at least one of the plurality of servers has a transaction manager supporting a single-phase commit protocol, and wherein at least one other of the plurality of servers has a transaction manager supporting a two-phase commit protocol; and the transaction manager on the first server selectively attempting to commit the registered resources using either the single-phase, two-phase or mixed-phase commit protocol in accordance with the results of the registration step, wherein the transaction manager attempting to commit a registered resource using the mixed-phase commit protocol comprises the steps of:

preparing to commit all resources registered as updateable and committable by the two-phase protocol;

attempting to commit all resources registered as updateable and committable by the single-phase protocol;

rolling-back any resources registered as updateable and committable by the single-phase commit protocol and any resources registered as updateable and committable by the two-phase commit protocol if the attempt to commit a resource registered as updateable and committable by the single-phase protocol was unsuccessful; and attempting to commit all resources registered as updateable and committable by the two-phase commit protocol if the attempt to commit all resources registered as updateable and committable by the single-phase protocol was successful.

2. The method of claim 1, further comprising the following steps of:

preceding the selective registration step, and responsive to the first server in the distributed object-oriented transaction processing environment receiving the client application's request for a global transaction involving the distributed object resources, designating the first server's transaction manager as root transaction manager and each other server's transaction manager as a subordinate transaction manager;

preceding the selective registration step, determining what commit procedure is supported by the root transaction manager and each subordinate transaction manager;

the root transaction manager performing the selective registration step in accordance with the determination of what commit procedure is supported by the root transaction manager and each of the subordinate transaction managers; and the root transaction manager selectively implementing either a single-phase, two-phase, or mixed-phase commit procedure for each object resource registered in the global transaction in accordance with how the resources are registered in the registration step.

3. The method of claim 1, wherein the step of registering object resources includes the step of a determination by the root transaction manager of which client application requested resources are allowed to participate in the global transaction, based on configuration information provided by a system administrator defining which commit procedure to use.

4. The method of claim 2, wherein the step of registering object resources includes the step of a determination by the root transaction manager of which client application requested resources are allowed to participate in the global transaction, based on configuration information provided by a system administrator defining which commit procedure to use.

5. The method of claim 4, wherein if the configuration information indicates a single-phase commit procedure is to be used, then each object resource requested by the client application is allowed to participate in the global transaction and is registered as being committable by a single-phase commit procedure.

6. The method of claim 4, wherein if the configuration information indicates a two-phase commit procedure is to be used, then any object resource requested by the client application that is supported by a two-phase commit protocol is allowed to participate in the global transaction by the root transaction manager and is registered as being committable by a two-phase commit procedure, while any requested object resource supported by a single-phase commit protocol is not allowed to participate in the global transaction by the root transaction manager.

7. The method of claim 4, wherein if the configuration information indicates a mixed-phase commit procedure is to be used, then any object resource requested by the client application is allowed to participate, and is registered as being committable by a mixed-phase commit procedure.

8. The method of claim 4, wherein if the participating object resources in the global transaction are registered as being committable by a single-phase commit procedure, then further comprising the step of the root transaction manager implementing a single-phase commit procedure for committing each participating object resource.

9. The method of claim 4, wherein if the object resources participating in the global transaction are registered as being committable by a two-phase commit procedure, then further comprising the step of the root transaction manager implementing a two-phase commit procedure for committing each object resource registered as being committable by a two-phase commit procedure.

10. The method of claim 4, wherein if the object resources participating in the global transaction are registered as being committable by a mixed-phased commit procedure, then further comprising the steps of:

the root transaction manager preparing all object resources being supported by a two-phase commit procedure;

the root transaction manager committing all object resources being supported by a single-phase commit procedure; and the root transaction manager committing all object resources being supported by a two-phase commit procedure.

11. The method of claim 5, wherein if the participating object resources in the global transaction are registered as being committable by a single-phase commit procedure, then further comprising the step of the root transaction manager implementing a single-phase commit procedure for committing each participating object resource.

12. The method of claim 6, wherein if the object resources participating in the global transaction are registered as being committable by a two-phase commit procedure, then further comprising the step of the root transaction manager implementing a two-phase commit procedure for committing each object resource registered as being committable by a two-phase commit procedure.

13. The method of claim 7, wherein if the object resources participating in the global transaction are registered as being committable by a mixed-phased commit procedure, then further comprising the steps of:

the root transaction manager preparing all object resources being supported by a two-phase commit procedure;

the root transaction manager committing all object resources being supported by a single-phase commit procedure; and the root transaction manager committing all object resources being supported by a two-phase commit procedure.

14. A system for supporting a plurality of different commit procedures in a distributed object-oriented transaction processing environment including a plurality of server computers over which objects are distributed and at least one client application, the system comprising:

a server computer denominated as the root server having a processing unit coupled with main memory and further coupled with storage; and a transaction manager operating in the main memory of the root server that is configured for communicating with the processing unit to perform the computer-executed steps, all performed within a single transaction commit cycle, of:

selectively registering distributed object resources requested by a client application for a global transaction as being updateable and committable by either a single-phase, two-phase, or mixed-phase protocol, wherein the object resources are distributed among the plurality of server computers including the root server, wherein at least one of the plurality of servers has a transaction manager supporting a single-phase commit protocol, and at least one other of the plurality of servers has a transaction manager supporting a two-phase commit protocol; and the transaction manager on the root server selectively attempting to commit the registered resources using either the single-phase, two-phase or mixed-phase commit protocol in accordance with the results of the registration step, wherein the transaction manager attempting to commit a registered resource using the mixed-phase commit protocol comprises the steps of:

preparing to commit all resources registered as updateable and committable by the two-phase protocol;

attempting to commit all resources registered as updateable and committable by the single-phase protocol;

rolling-back any resources registered as updateable and committable by the single-phase commit protocol and any resources registered as updateable and committable by the two-phase commit protocol if the attempt to commit a resource registered as updateable and committable by the single-phase protocol was unsuccessful; and attempting to commit all resources registered as updateable and committable by the two-phase commit protocol if the attempt to commit all resources registered as updateable and committable by the single-phase protocol was successful.

15. The system of claim 14, wherein preceding the selective registration step, and responsive to the root server in the distributed object-oriented transaction processing environment receiving the client application's request for a global transaction involving the distributed object resources, denominating the root server's transaction manager as root transaction manager and each other server's transaction manager as a subordinate transaction manager, and the root transaction manager is further configured for performing the computer-executed steps of:

preceding the selective registration step, determining what commit procedure is supported by the root transaction manager and each subordinate transaction manager;

performing the selective registration step in accordance with the determination of what commit procedure is supported by the root transaction manager and each of the subordinate transaction managers; and selectively implementing either a single-phase, two-phase, or mixed-phase commit procedure for each object resource registered in the global transaction in accordance with how the resources are registered in the registration step.

16. The system of claim 15, wherein the root transaction manager is configured for performing the step of registering object resources by including the step determining which client application requested resources are allowed to participate in the global transaction, based on configuration information provided by a system administrator defining what commit procedure to use.

17. The system of claim 16, wherein if the configuration information indicates a single-phase commit procedure is to be used, then the root transaction manager is further configured for performing the computer-executed steps of allowing each object resource requested by the client application to participate in the global transaction and registering each participating object resource as being committable by a single-phase commit procedure.

18. The system of claim 16, wherein if the configuration information indicates a two-phase commit procedure is to be used, then the root transaction manager is further configured for performing the computer-executed steps of allowing any object resource requested by the client application that is supported by a two-phase commit protocol to participate in the global transaction, and registering each participating object resource as being committable by a two-phase commit procedure, while any requested object resource supported by a single-phase commit protocol is not allowed to participate in the global transaction by the root transaction manager.

19. The system of claim 16, wherein if the configuration information indicates a mixed-phase commit procedure is to be used, then the root transaction manager is further configured for performing the computer-executed steps of allowing any object resource requested by the client application to participate, and registering each participating object resource as being committable by a mixed-phase commit procedure.

20. The system of claim 16, wherein if the participating object resources in the global transaction are registered as being committable by a single-phase commit procedure, then the root transaction manager is further configured for performing the computer-executed step of implementing a single-phase commit procedure for committing each participating object resource.

21. The system of claim 16, wherein if the participating object resources in the global transaction are registered as being committable by a two-phase commit procedure, then the root transaction manager is further configured for performing the computer-executed step of implementing a two-phase commit procedure for committing each object resource registered as being committable by a two-phase commit procedure.

22. An apparatus for supporting a plurality of different commit procedures in a distributed object-oriented transaction processing environment including a plurality of server computers over which objects are distributed and at least one client application, comprising:

a first server computer including a processing unit;

a main memory for executing a computer program that is in communication with the processing unit; and transaction manager logic operating in main memory of the first server and an object transaction service module that further includes a registration module and a commit module, wherein the registration module includes computer-executable logic that enables it to selectively register distributed object resources requested by a client application for a global transaction as being updateable and committable by either a single-phase, two-phase, or mixed-phase protocol, wherein the object resources are distributed among the plurality of servers including the first server, wherein at least one of the plurality of servers has a transaction manager supporting a single-phase commit protocol, and at least one other of the plurality of servers has a transaction manager supporting a two-phase commit protocol; and the commit module includes computer-executable logic for selectively committing the registered resources in accordance with the results of the registration step, wherein the computer-executable logic for committing a resource registered as updateable and committable by the mixed-phase commit protocol comprises:

computer-executable logic for preparing to commit all resources registered as updateable and committable by the two-phase protocol;

computer-executable logic for attempting to commit all resources registered as updateable and committable by the single-phase protocol;

computer-executable logic for rolling-back any resources registered as committable by the single-phase commit protocol and any resources registered as updateable and committable by the two-phase commit protocol if the attempt to commit a resource registered as updateable and committable by the single-phase protocol was unsuccessful; and computer-executable logic for attempting to commit all resources registered as updateable and committable by the two-phase commit protocol if the attempt to commit all resources registered as updateable and committable by the single-phase protocol was successful.

23. A program-product for use in a computer system for supporting a plurality of different commit procedures in a distributed object-oriented transaction processing environment including a plurality of server computers over which objects are distributed and at least one client application, comprising:

a registration module that selectively registers distributed object resources requested by a client application for a global transaction as being updateable and committable by either a single-phase, two-phase, or mixed-phase protocol, wherein the registration module is executed on the computer system, wherein the object resources are distributed among the plurality of servers including the first server, wherein at least one of the plurality of servers has a transaction manager supporting a single-phase commit protocol, and at least one other of the plurality of servers has a transaction manager supporting a two-phase commit protocol;

a commit module that selectively commits the registered resources in accordance with the results of the registration step when the commit module is executed on the computer system; and signal-bearing media, bearing the registration and commit modules;

wherein the commit module commits each resource registered as updateable and committable by the mixed-phase commit by, as a first step, preparing to commit all resources registered as updateable and committable by the two-phase protocol;

wherein the commit module commits each resource registered as updateable and committable by the mixed-phase commit by, as a second step, attempting to commit all resources registered as updateable and committable by the single-phase protocol;

wherein the commit module commits each resource registered as updateable and committable by the mixed-phase commit by, as a third step, rolling-back any resources registered as updateable and committable by the single-phase commit protocol and any resources registered as updateable and committable by the two-phase commit protocol if the attempt to commit a resource registered as updateable and committable by the single-phase protocol was unsuccessful; and wherein the commit module commits each resource registered as updateable and committable by the mixed-phase commit by, as a fourth step, attempting to commit all resources registered as updateable and committable by the two-phase commit protocol if the attempt to commit all resources registered as updateable and committable by the single-phase protocol was successful.

* * * * *